Dec. 22, 1959  J. LAZAR ET AL  2,918,313
BALL AND SOCKET PIPE COUPLING WITH LUBRICATED SEAL
Filed March 18, 1955  3 Sheets-Sheet 1
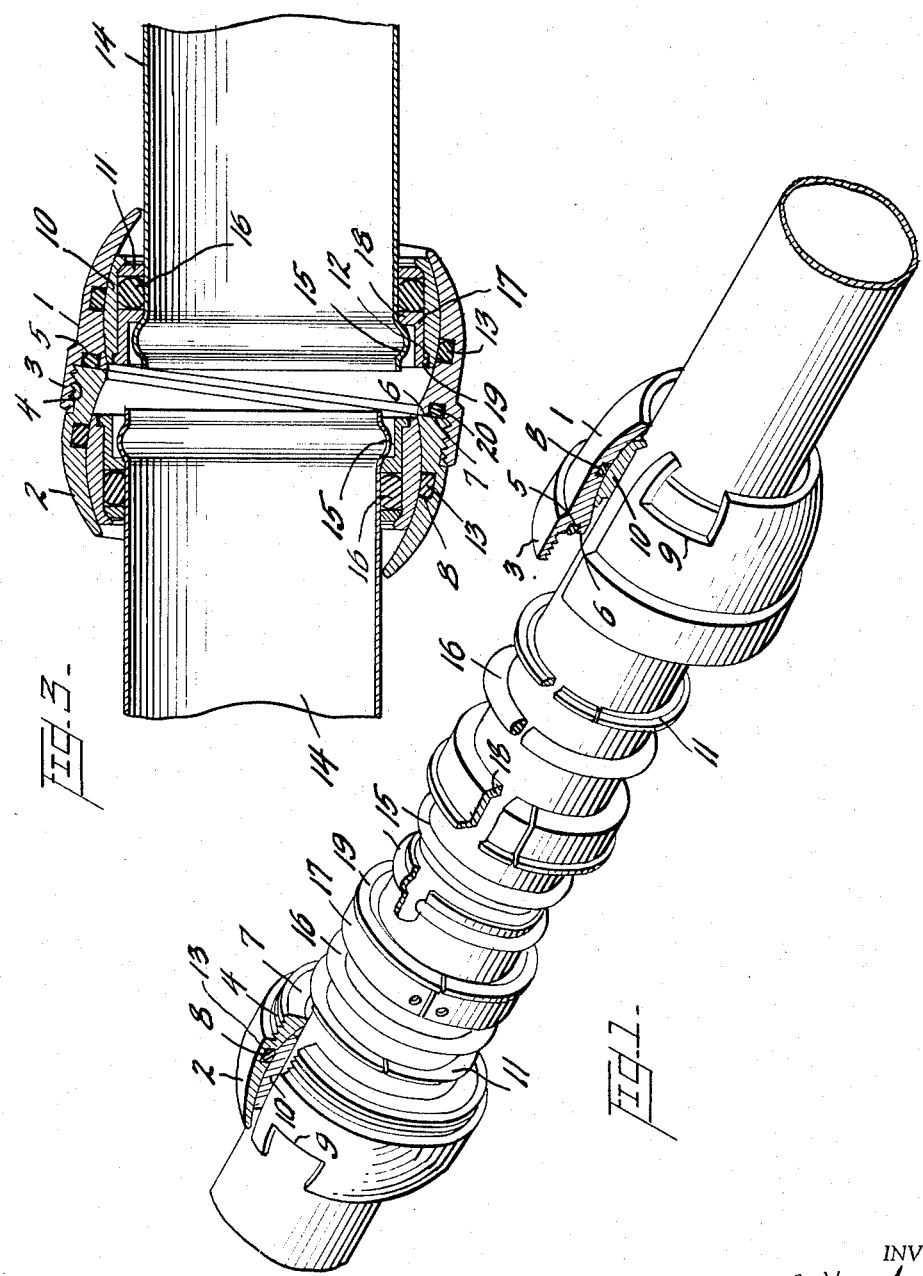
INVENTORS,
C. H. Smith.
James Lazar and Richard J. Zeitler.
BY Watson, Cole, Grindle & Watson,
ATTORNEY.

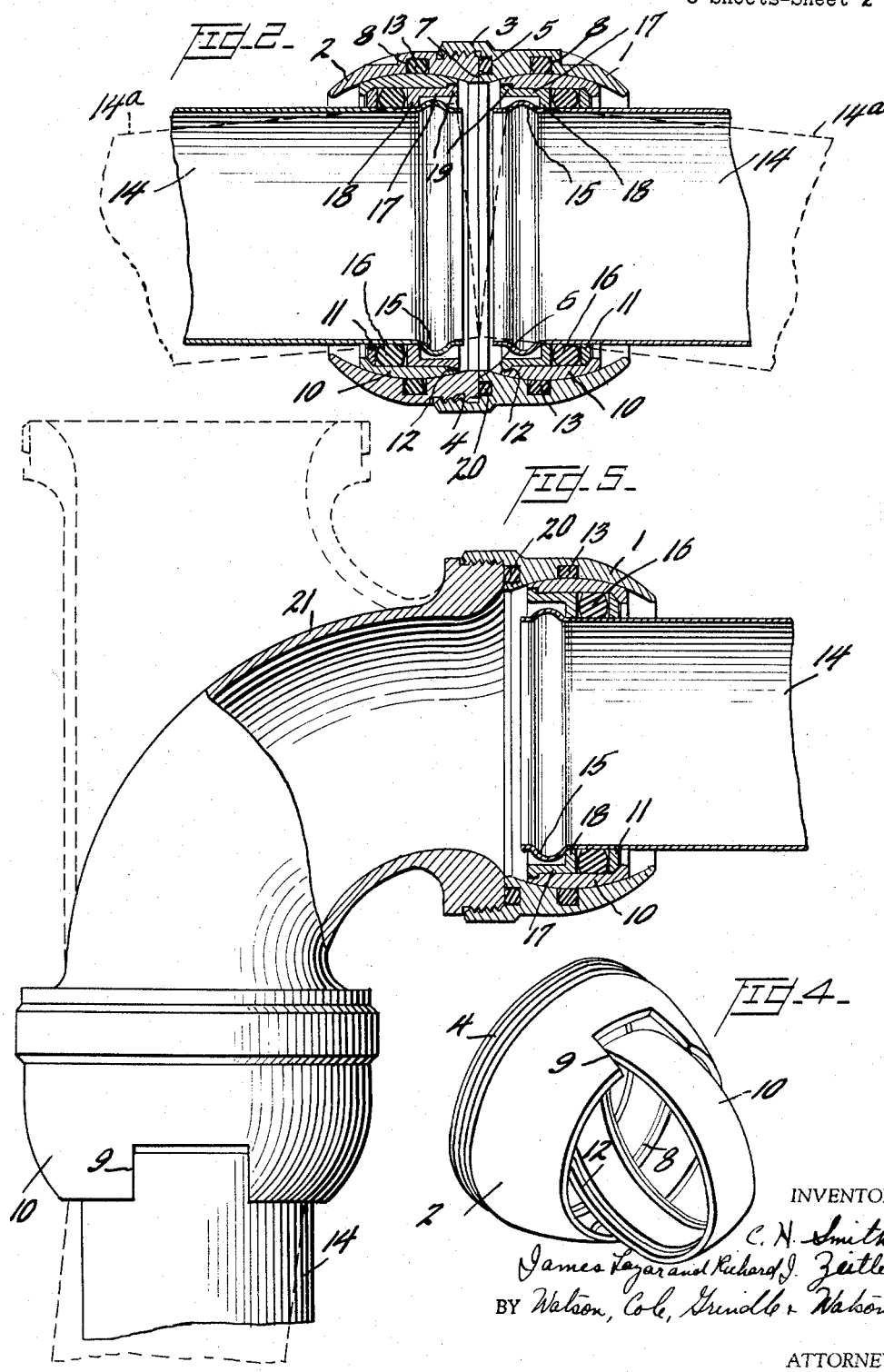

Dec. 22, 1959   J. LAZAR ET AL   2,918,313
BALL AND SOCKET PIPE COUPLING WITH LUBRICATED SEAL
Filed March 18, 1955   3 Sheets-Sheet 3

INVENTORS,
C. N. Smith,
James Lazar and Richard J. Zeitler.
BY Watson, Cole, Grindle & Watson,
ATTORNEY.

United States Patent Office 2,918,313
Patented Dec. 22, 1959

2,918,313

BALL AND SOCKET PIPE COUPLING WITH LUBRICATED SEAL

James Lazar, Washington, D.C., and Richard John Zeitler, Baltimore, and Charles Harry Smith, Annapolis, Md., assignors to Flight Refueling Incorporated, Baltimore, Md., a corporation of Delaware Application March 18, 1955, Serial No. 495,162

6 Claims. (Cl. 285—94)

This invention relates to an improved connector for coupling pipes or tubing which are subjected to internal fluid pressure during use.

A principal object of this invention is the design of a connector which provides axial, radial and rotary movement between coupled pipes either singularly or simultaneously, and parallel offset or combinations of angular and offset misalignment between a pair of coupled pipes.

The novel connector of this invention features a leak-proof double ball and socket joint of a floating nature which in a first preferred embodiment is capable of interconnecting two sections of pre-beaded pipe or tubing. The pipes joined within the connector housing are independently movable with respect to each other and in a manner defined by the associated ball and socket in each half of the connector housing. Inasmuch as the ball and socket joint of each half of the connector provides independent axial, angular and rotary movement for the associated pipe section, this half section may also be individually coupled to elbows, T's; Y's, valves and various other pipeline fittings. Accordingly it is within the contemplation of this invention to provide a coupling which permits relative movement of the axis of two pipes with respect to each other even though such axis may normally lie in different planes. For example the axis of the two pipes so connected may normally define a right angle.

The basic double ball and socket structure employed in the connector of this invention includes a fluid seal which is so designed that only the forces created by the normal working fluid pressures are transmitted to the sealing members. All other forces such as tubing end load and those due to offset, axial, angular, and rotary motions which may be imposed upon the assembled connector under normal working conditions are not transmitted to the sealing members within the connector housing. Therefore, these forces do not subject the sealing components to permanent set, rupture, or other harmful conditions.

In order that all of the features for attaining the objects of this invention may be readily understood, reference is herein made to the drawings wherein:

Figure 1 is an exploded view of the components of the flexible pipe connector of this invention;

Figure 2 is a sectional view of the pipe connector shown in Figure 1 when assembled;

Figure 3 is a sectional view of the pipe connector of Figures 1 and 2 and showing a centerline offset positioning of coupled pipes;

Figure 4 is a perspective view showing the manner in which a ball element is inserted within a connector housing;

Figure 5 shows the application of the connector of this invention to a pipe elbow.

Figure 6:
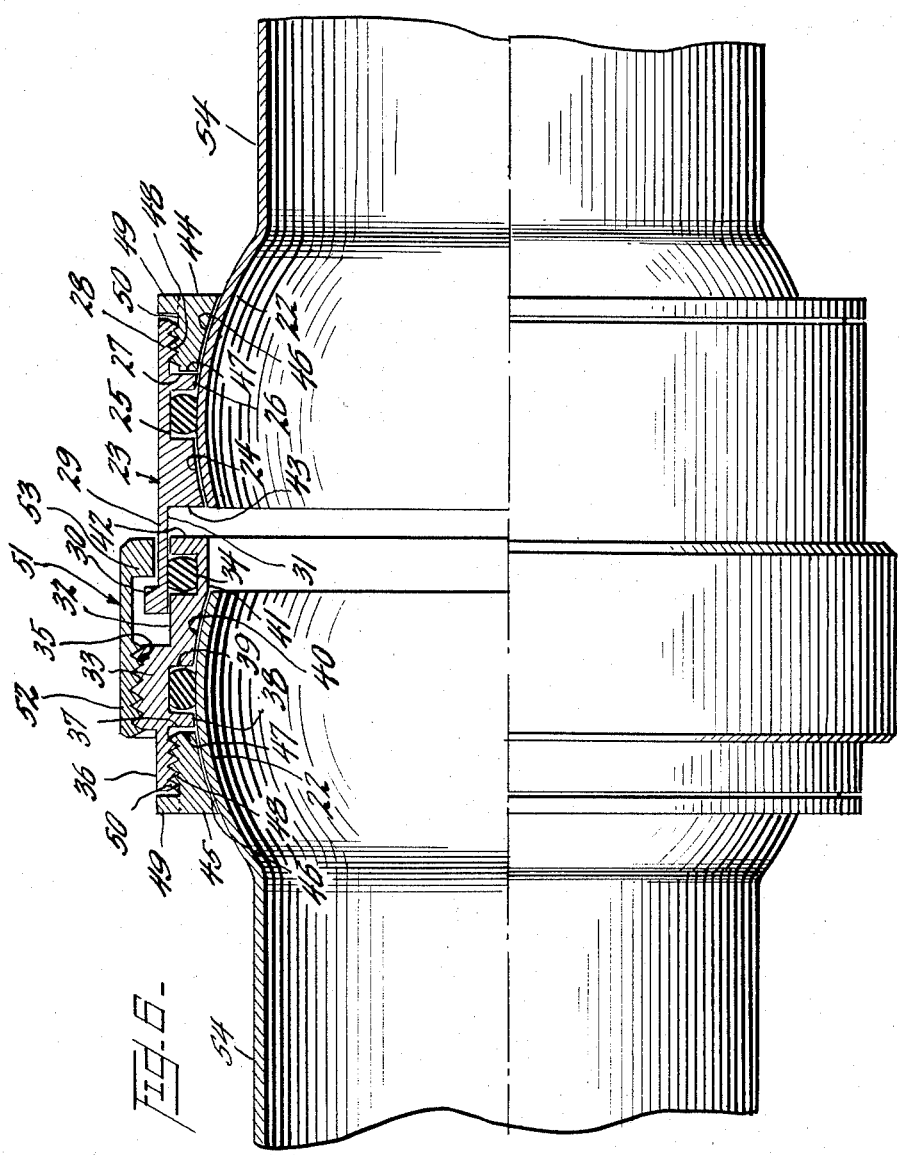
Figure 6 shows an alternative connector embodiment featuring a simplified design.

The preferred embodiment of the pipe connector of this invention shown in Figures 1 through 4 comprises two half sections which are coupled together to form a flexible double ball and socket joint. The nut-end 1 and the body-end 2 are threaded one to the other to form the connector housing. The internal components housed within each of the connector sections are exactly identical, and therefore the internal components are interchangeable. In order to avoid repetitious description of duplicate parts, only the components forming the connector housing and one half of the connection will be hereinafter described in detail.

The nut-end 1 and body-end 2 are structurally identical except that nut-end 1 has an internally threaded sleeve 3 which extends beyond the main body, whereas body-end 2 is externally threaded on its periphery at 4 so that it will provide full thread engagement for nut-end 1, and also nut-end 1 is provided with a sealing ring groove 5 located along sealing face 6 of nut-end 1. Sealing ring groove 5 has a smaller major diameter than the included internal thread and is concentric therewith so that the assembly including sealing ring 20 will be flush and tangent with sealing face 7 of body-end 2.

Both end halves 1 and 2 of the connector housing form identical half sockets for the connector. A sealing ring groove 8 is located centrally along the inside surface and beyond the spherical radius of each socket half.

The rear of both halves 1 and 2 of the connector housing are formed with slots or grooves 9 located at right angles and tangent to the aforementioned sealing ring groove 8. The slots 9 are of equal diameter and begin from the ends opposite their respective threads and extend to the centerline of the aforementioned sealing ring groove 8 with a width which is slightly larger than ball 10 so as to permit the insertion of ball 10 into the socket as is shown in Figure 4.

The ball shaped member 10 is a spherically shaped sleeve having a stepped inner diameter in which the smallest diameter angles toward the larger sealing diameter and is less than the major diameter of split washer 11. The angle conforms with the chamfer provided on split washer 11 and blends smoothly into the actual sealing diameter which terminates with a shoulder 12. Shoulder 12 blends into the aforementioned spherical radius of ball 10.

A lubricated sealing ring 13 is inserted into groove 8 after which ball member 10 is inserted through slot 9 of either nut-end 1 or body-end 2 to the full depth of slot 9. At this point the respective mating diameters of the socket and ball 10 are concentric and coincide with each other. Thereafter ball 10 may be revolved 90° within the socket or until the inside sealing diameter of the ball 10 and the thread diameters of the nut-end 1 or the body-end 2 are concentric and parallel with each other. The connector assembly may now be axially slipped onto and over pipe 14 until the assembly has completely cleared and lies beyond the pipe end bead 15.

With the connector body halves positioned on pipes 14 and both beads 15 being exposed, a split washer 11, having its inside diameter almost equal to the minor sealing diameter of ball 10, is sprung over bead 15 and onto pipe 14 and slipped back sufficiently to permit passing a lubricated ring seal 16 over bead 15 and directly in front of split washer 11.

Split bead retainer 17 is formed with its smallest inside diameter almost equal to, but slightly larger than the outside diameter of pipe 14. The smallest outside diameter of retainer 17 is equal to the outside diameter of split washer 11 and the sealing inside diameter of ball 10. Retainer 17 is provided with an axial load resisting shoulder 18 shaped so as to mate with bead 15, and a continuous circular outer lug to mate with shoulder 12 located on the front of ball 10. Bead retainer 17 is expanded and sprung over tubing 14 so that it may be slipped over and behind bead 15.

The nut-end 1 and body-end 2 are then slipped over the split washer 11, lubricated sealing ring 16 and bead retainer 17, and are brought together for thread engagement. Prior to coupling both ends 1 and 2, a lubricated sealing ring 20 is placed into groove 5 which is located on the sealing face 6 of nut-end 1. The threads are concentrically engaged and tightened to the full extent of the effective thread, thereby compressing sealing ring 20 between sealing surfaces 6 and 7.

One positioning of coupled pipes 14 in response to pipe flexure within the connector of this invention is represented by broken lines 14a shown in Figure 2. A centerline offset positioning of coupled pipes 14 is shown in Figure 3.

The pipes joined within the connector housing are independently movable with respect to each other. Each half of the connector comprises a ball and socket joint which functions independently, and as such provides axial, angular and rotary movement for the connected tubing. The structure of this invention may, therefore, be advantageously employed in combining several nut-half connections with elbows, for example elbow 21 shown in Figure 5, T's, Y's, valves and various other pipeline fittings.

The preferred embodiment of the pipe connector shown in Figure 6 presents some measure of simplification in the connector shown in Figures 1 through 5. The components forming the ball and the components contained therein between the pipe and the annular surface of the ball are eliminated in the embodiment of Figure 6 by forming the ball on the periphery of the pipe ends which are to be connected.

The ends of pipes 54 which are to be joined are formed with spherical bulges 22 so that the respective pipe centerlines include the origin for the spherical radius of each bulge. The spherical surface 22 formed serves as the ball member of the double ball and socket joint. Female housing 23 includes an annular spherical surface 24 along which is located a sealing ring groove 25 which terminates at an annular shoulder 26 located adjacent face 27 which develops into a female threaded sleeve 28. The outside surface of female housing 23 extends from threaded sleeve 28 to a sleeve projection 29 which terminates at a shoulder 30.

Annular sleeve surface 31 extends from shoulder 30 to the slide stop face 43. Stop face 43 develops into the aforementioned spherical annular surface 24. Annular sleeve 31 is concentric with and slidable over surface 32 of the male housing 33 which ring has a sealing groove 34 located along the periphery of surface 32 which is operative beneath annular sleeve surface 31 of the female housing, whereby leakage along the sliding surfaces is prevented. Surface 32 develops into a male thread 35 which terminates with a female threaded sleeve and is identical with the projection and threaded sleeve 28 of the female housing 23. The female thread terminates oppositely to the face 37 which is adjacent and at right angles to the annular shoulder 38. This shoulder is adjacent to sealing ring groove 39 located along the annular spherical surface 40 which terminates with a projection 41. Face 42 is adjacent and at right angles with the sealing ring groove 34 which is located along the sliding surface whereby the faces 42 and 43 operatively provide an axial stop with respect to each other.

Nuts 44 and 45 are identical and completely interchangeable as one piece and are preferably made as one piece having a spherically annular surface 46, a thread engagement stop 47, a male thread 48 on its outer periphery, and a series of intermittent slots or lugs 49 at the termination of said nuts 44 and 45. It is not necessary to split the nut into two identical halves if the forming of the spherical bulge 22 onto the tubing ends is performed immediately prior to connecting the aforementioned tubes, because it may become desirous to make nuts 44 and 45 a permanent part of the tubing assembly. If the source of the tubing provides prematurely formed spherical bulges 22 on the tubing ends, said split or cut is necessary in order to place the nut on to the tubing behind the aforementioned spherical bulge 22. A split nut should preferably include a circular groove located in the thread relief 50 between said thread and the aforementioned slots or lugs 49. This circular groove is provided with a locking ring or wire form for the purpose of properly uniting the two halves with each other. The respective thread halves are accordingly held in line so as to permit the nut halves to operatively function as a one-piece nut upon initial thread engagement to the housing.

A coupling sleeve 51 provided with a female threaded sleeve 52 and a thread relief which terminates at the shoulder 53 along its annular surface and having its periphery nurled provides coupling means for connecting the female housing 23 and the male housing 33.

Assembly of this connector embodiment involves inserting the sealing rings into the provided sealing ring grooves and then placing the respective male 33 and female housing 23 onto either spherical bulge so that the sealing rings contact said spherical tube bulge whereby the external sealing ring application lies between the aforementioned internal sealing rings of each housing and so that the projection of the male housing may be slipped into the annular sleeve projection of the female housing. The sealing surfaces are therefore parallel and concentric with each other and the said external sealing ring is in direct compression between the aforementioned surface and sealing ring groove. With the two nuts being identical and interchangeable with each other, the aforementioned housings are then threaded to the provided female threads of each housing so that the annular spherical surfaces of each nut with each housing complements the other to conform to the spherical bulge on the tube or pipe. The bulge is, therefore, spherically locked between said nuts and their respective housing halves so that separation of the body halves is possible only through the sealed sliding joint between the male and female housing. Such sliding action is limited to prevent such separation by the coupling sleeve which is slipped over the partially uninterrupted periphery of the female housing so that the internal shoulder of the sleeve engages the external shoulder of the female housing and whereby said shoulder stops may be locked or positioned to each other by engagement of the female thread of the coupling sleeve to the male thread located on the periphery of the male housing.

Said aforementioned and described alternate connector being operatively coupled to pipes or tubes having spherically bulged ends as described herein functions according to the enclosed specification and thereby provides axial, radial and rotary movement between coupled pipes either singularly or simultaneously, and parallel, offset, or combinations of angular and offset misalignment between a pair of coupled pipes.

It is to be understood that the above-described arrangements are illustrative of the applications of the principles of this invention. Numerous other arrangements may be devised by those skilled in the art without departing from the scope of the invention.

Having thus described the invention, what is claimed as new and desired to be secured by Letters Patent is:

1. A pipe connector for coupling the terminal end of a first pipe to a second pipe having a projecting annular end bulge, comprising a tubular section, means connecting said tubular section to said first pipe in fluid sealing relationship, said section having a pair of diametrically opposite slots in the section wall extending to the uncoupled end of the section and at right angles to the section diameter and having a socket with an inner spherical surface, a lubricated sealing ring positioned in a continuous annular groove substantially in the diametrical plane of the inner spherical surface of said section, said plane being transverse to the axis of said section, a tubular ball segment having a spherical outer surface closely mating with the inside surface of the tubular section, said ball segment being operatively positioned within the section by insertion through the slots to the full depth of the slots at which point the respective inner and outer surfaces of the socket and ball segment are concentric and coincide with each other wherein the ball segment is capable of being revolved within the socket, said ball segment having a cylindrical inner surface and inwardly extending flange means adjacent the outer edge of said ball segment, said flange means slidably engaging the outer surface of said second pipe outwardly of said annular end bulge, a tubular split bead retainer positioned within said ball and being formed with a substantially continuous circular outer lug mating with a shoulder formed on the inside diameter of said ball segment and along the inner edge, and means maintaining said split retainer in fixed relation in said ball segment, said retainer also including an inwardly directed circular axial load resisting shoulder slidably engaging the outer surface of said second pipe and adapted to abut the outer side of the projecting annular end bulge of said second pipe thereby holding said second pipe to the connector, said flange means and said load resisting shoulder being axially spaced and sealing means positioned therebetween and engaging said second pipe and said cylindrical inner surface of said ball segment.

2. A pipe connector according to claim 1 wherein said retainer has an inner diameter portion axially between said load resisting shoulder and said outer lug, said inner diameter being larger than the outer diameter of said bulge to receive the bulge therein.

3. A pipe connector according to claim 1 wherein said flange means comprises an inwardly directed flange on the ball segment having an inner diameter larger than the outer diameter of said bulge and a split washer abutting said inwardly directed flange.

4. A pipe connector according to claim 1 wherein said means connecting said first pipe and said tubular section comprises a second tubular section secured to said first tubular section, a second ball segment in said second tubular section and having an inwardly directed shoulder on one end thereof and an outwardly directed shoulder on the opposite end thereof, a second split bead retainer adapted to snugly engage the inner surface of said last-mentioned ball segment, a second sealing ring, a second sealing means and a second flange means, said first pipe having a projecting annular end bulge thereon, said second split ring retainer having an inner diameter less than the outer diameter of said last-mentioned bulge, said second ball segment, said second sealing ring, said second sealing means, said second flange means and said second retainer being similar to said respective first sealing ring, first sealing means and first flange means.

5. A pipe connector according to claim 4 wherein said retainer has an inner diameter portion axially between said load resisting shoulder and said outer lug, said inner diameter being larger than the outer diameter of said bulge to receive the bulge therein.

6. A pipe connector according to claim 4 wherein said flange means comprises an inwardly directed flange on the ball segment having an inner diameter larger than the outer diameter of said bulge and a split washer abutting said inwardly directed flange.

References Cited in the file of this patent

UNITED STATES PATENTS

| | | |
|---|---|---|
| 937,533 | Kelly et al. | Oct. 19, 1909 |
| 1,266,061 | Scoville | May 14, 1918 |
| 2,085,922 | Moore | July 6, 1937 |
| 2,376,995 | Fisher | May 29, 1945 |
| 2,421,691 | Gibson et al. | June 3, 1947 |
| 2,456,182 | Goble | Dec. 14, 1948 |
| 2,521,127 | Price | Sept. 5, 1950 |
| 2,556,659 | Patterson | June 12, 1951 |
| 2,616,728 | Pitt | Nov. 4, 1952 |
| 2,693,371 | Nelson | Nov. 2, 1954 |
| 2,826,437 | Detweiler et al. | Mar. 11, 1958 |

FOREIGN PATENTS

| | | |
|---|---|---|
| 883,640 | France | Mar. 29, 1943 |
| 926,966 | France | Apr. 28, 1947 |